United States Patent

Gareiss et al.

[11] Patent Number: 6,084,012
[45] Date of Patent: Jul. 4, 2000

[54] FLAME RESISTANT THERMOPLASTIC MOULDING MATERIALS

[75] Inventors: Brigitte Gareiss, Obersülzen; Martin Klatt, Mannheim; Heiner Görrissen, Ludwigshafen, all of Germany

[73] Assignee: BASF Aktiengesellschaft, Ludwigshafen, Germany

[21] Appl. No.: 09/297,917

[22] PCT Filed: Nov. 5, 1997

[86] PCT No.: PCT/EP97/06119

§ 371 Date: May 12, 1999

§ 102(e) Date: May 12, 1999

[87] PCT Pub. No.: WO98/23676

PCT Pub. Date: Jun. 4, 1998

[30] Foreign Application Priority Data

Nov. 22, 1996 [DE] Germany .................. 196 48 503

[51] Int. Cl.[7] .............. C08K 5/00; C08K 5/09; C08K 5/10
[52] U.S. Cl. ............ 524/80; 524/296; 524/311; 524/414; 524/451; 524/472; 524/488
[58] Field of Search ............... 524/296, 311, 524/80, 414, 451, 472, 488

[56] References Cited

U.S. PATENT DOCUMENTS

| | | | |
|---|---|---|---|
| 4,092,284 | 5/1978 | Theysohn et al. | 260/28 R |
| 4,104,735 | 8/1978 | Dany et al. | 264/143 |
| 4,187,207 | 2/1980 | Cerny et al. | 525/2 |
| 4,188,313 | 2/1980 | Cerny et al. | 260/37 EP |
| 5,135,971 | 8/1992 | Steiert et al. | 524/80 |
| 5,543,444 | 8/1996 | Kobayashi et al. | 523/205 |

FOREIGN PATENT DOCUMENTS

| | | |
|---|---|---|
| 71 788 | 7/1983 | European Pat. Off. . |
| 176 836 | 4/1986 | European Pat. Off. . |
| 384 242 | 8/1990 | European Pat. Off. . |
| 1 592 813 | 7/1981 | United Kingdom . |

OTHER PUBLICATIONS

Database WPI, Se. Ch., Week 8711, AN87–075455, XP 002060327.

*Primary Examiner*—Kriellion Sanders
*Attorney, Agent, or Firm*—Keil & Weinkauf

[57] ABSTRACT

Thermoplastic molding compositions comprise

A) from 5 to 99% by weight of a thermoplastic polymer selected from the group consisting of polyamides, polyesters, polyphenylene ethers and mixtures of these, B) from 1 to 60% by weight of red phosphorus which has been pretreated with from 0.01 to 2% by weight, based on 100% by weight of B), of a phlegmatizer and from 2 to 15% by weight of a mineral filler, C) from 0 to 70% by weight of other additives and processing aids, where the sum of the percentages by weight of components A) to C) is 100%.

7 Claims, No Drawings

FLAME RESISTANT THERMOPLASTIC MOULDING MATERIALS

The present invention relates to thermoplastic molding compositions comprising
- A) from 5 to 99% by weight of a thermoplastic polymer selected from the group consisting of polyamides, polyesters, polyphenylene ethers and mixtures of these,
- B) from 1 to 60% by weight of red phosphorus which has been pretreated with from 0.01 to 2% by weight, based on 100% by weight of B), of a phlegmatizer and from 2 to 15% by weight of a mineral filler,
- C) from 0 to 70% by weight of other additives and processing aids, where the sum of the percentages by weight of components A) to C) is 100%.

The invention also relates to the use of the novel molding compositions for producing fibers, films and shaped articles, and to the resultant shaped articles.

During the incorporation of red phosphorus into polymer melts, safety problems arise because of dust formation and phosphine development.

DE-A 27 03 052 discloses flame-retardant thermoplastic molding compositions in which red phosphorus was stabilized by adding aluminum salts, or magnesium salts, of ethylenediaminetetraacetic acid (EDTA) or nitrilotriacetic acid (NTA).

The metal ions, however, bring about a worsening of the electrical properties of the plastic moldings which restricts their range of application.

EP-A 71 788 discloses polyamide molding compositions in which the red phosphorus is coated, before incorporation, with binder resins derived from phenol and isobutyraldehyde or cyclohexanone.

DE-A 27 45 076 discloses other phenol-formaldehyde binder resins as materials for coating phosphorus.

When phosphorus which has been pretreated in this way is incorporated into the polymer melt, the binder resins are degraded to some extent. The formaldehyde thus formed reacts with the thermoplastics, giving rise to a general deterioration in the mechanical properties of the shaped articles which can be produced from them.

In addition, DE-A 24 08 488 discloses wax and wax-like substances as binder for red phosphorus.

DE-A 26 25 674 discloses, furthermore, epoxy-containing compounds as binder resins for red phosphorus.

These binder resins are, however, poorly compatible with the thermoplastics, so that incorporation is made more difficult (agglomeration), and the low adhesion leads to a deterioration in the mechanical properties of the shaped articles which can be produced from them.

EP-A 176 836 and EP-A 384 232, furthermore, disclose polyurethanes and polyester-polyurethanes, and organic phlegmatizers which can be emulsified in water, such as dioctyl phthalate, for coating phosphorus.

DE-A 25 51 718, inter alia, discloses mineral fillers as additives in flame-retardant polyamides.

It is an object of the present invention to provide readily obtainable flame-retardant thermoplastic polyamide molding compositions and polyester molding compositions which have good flame retardancy with good mechanical properties, and also to ensure, to a sufficient extent, the thermal stability of the flame-retardant phosphorus mixture which is employed.

We have found that this object is achieved by means of the flame-retardant molding compositions defined at the outset. Preferred molding compositions of this type, together with a method for their use, are described in the subclaims.

Surprisingly, a combination of phlegmatizer with a mineral filler gives not only stable phlegmatized phosphorus but also improved flame retardancy, so that shaped articles with very low wall thicknesses show very good flame-retardant properties and high phosphorus stability.

The novel molding compositions include, as component (A), from 5 to 99% by weight, preferably from 20 to 90% by weight, and in particular from 20 to 80% by weight, of a thermoplastic polyamide or polyester or polyphenylene ether or mixtures of these. Polyesters which are used are generally based on aromatic dicarboxylic acids and an aliphatic or aromatic dihydroxy compound.

A first group of preferred polyesters consists of polyalkylene terephthalates having from 2 to 10 carbon atoms in the alcohol moiety.

Polyalkylene terephthalates of this type are known per se and are described in the literature. They contain, in their main chain, an aromatic ring which derives from the aromatic dicarboxylic acid. The aromatic ring may also be substituted, for example with halogen, such as chlorine or bromine, or with $C_1$–$C_4$-alkyl, such as methyl, ethyl, isopropyl or n-propyl, n-butyl, isobutyl or tert-butyl.

These polyalkylene terephthalates can be prepared by reaction of aromatic dicarboxylic acids, their esters or other ester-forming derivatives with aliphatic dihydroxy compounds, in a manner known per se.

Preferred dicarboxylic acids are, for example, 2,6-naphthalene-dicarboxylic acid, terephthalic acid and isophthalic acid or mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids or cyclohexanedicarboxylic acids.

Preferred aliphatic dihydroxy compounds are diols with from 2 to 6 carbon atoms, in particular 1,2-ethanediol, 1,4-butanediol, 1,6-hexanediol, 1,4-hexanediol, 1,4-cyclohexanediol, 1,4-cyclohexanedimethylanol, neopentyl glycol, and mixtures of these.

Preferred polyesters (A) are, for example, polyalkylene terephthalates derived from alkanediols having from 2 to 6 carbon atoms. Of these, particular preference is given to polyethylene terephthalate and polybutylene terephthalate.

The viscosity number of the polyesters (A) is generally in the range from 70 to 220, preferably from 100 to 150 (measured in a 0.5% strength by weight solution in a mixture of phenol and o-dichlorobenzene (weight ratio 1:1) at 25° C.

Particular preference is given to polyesters whose content of carboxyl end groups is up to 100 mval/kg, preferably up to 50 mval/kg, and in particular up to 40 mval/kg of polyester. Polyesters of this type may be prepared, for example, by the process of DE-A 44 01 055. The content of carboxyl end groups is generally determined by titration methods (eg. potentiometry).

A further group which may be mentioned is that of the fully aromatic polyesters derived from aromatic dicarboxylic acids and aromatic dihydroxy compounds.

Suitable aromatic dicarboxylic acids are the compounds described above in relation to polyalkylene terephthalates. Preference is given to mixtures of from 5 to 100 mol % of isophthalic acid and from 0 to 95 mol % of terephthalic acid, in particular mixtures of from about 80 to about 50% of terephthalic acid with about 20 to about 50% of isophthalic acid.

The aromatic dihydroxy compounds preferably have the formula I

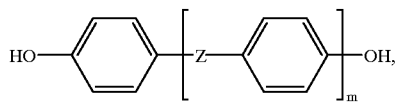

where Z is alkylene or cycloalkylene having up to 8 carbon atoms, arylene having up to 12 carbon atoms, carbonyl, sulfonyl, an oxygen or sulfur atom, or a chemical bond, and where m is from 0 to 2. Compounds I may also carry $C_1$–$C_6$-alkyl or -alkoxy and fluorine, chlorine or bromine as substituents on the phenylene groups.

Representative compounds are, for example,
dihydroxydiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α, α'-di(hydroxyphenyl)dialkylbenzene,
di(hydroxyphenyl) sulfone,
di(hydroxybenzoyl)benzene,
resorainol and
hydroquinone
and their ring-alkylated and ring-halogenated derivatives.

Of these, preferred compounds are
4,4'-dihydroxydiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and in particular
2,2-di(4-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
and mixtures of these.

It is also possible, of course, to employ mixtures of polyalkylene terephthalates and fully aromatic polyesters. These generally include from 20 to 98% by weight of the polyalkylene terephthalate and from 2 to 80% by weight of the fully aromatic polyester.

For the purposes of the present invention, polyesters also include polycarbonates which can be obtained by polymerization of aromatic dihydroxy compounds, in particular 2,2-bis(4-hydroxy-phenyl)propane (bisphenol A) and its derivatives, for example with phosgene. Products of this type are known per se and are described in the literature, and are mostly also commercially available. The amount of the polycarbonates is up to 90% by weight, preferably up to 50% by weight, based on 100% by weight of component (A).

Polyester block copolymers, such as copolyether esters, may, of course, also be used. Products of this type are known per se and are described in the literature, for example in U.S. Pat. No. 3,651,014. Corresponding products are also commercially available, for example Hytrel® (DuPont).

The polyamides of the novel molding compositions generally have a viscosity number of from 90 to 350, preferably from 110 to 240 ml/g, determined in a 0.5% strength by weight solution in 96% strength by weight sulfuric acid at 25° C., according to ISO 307.

Preference is given to semicrystalline or amorphous polymers with a molecular weight (weight average) of at least 5000, as described, for example, in U.S. Pat. No. 2,071,250, U.S. Pat. No. 2,071,251, U.S. Pat. No. 2,130,523, U.S. Pat. No. 2,130,948, U.S. Pat. No. 2,241,322, U.S. Pat. No. 2,312,966, U.S. Pat. No. 2,512,606 and U.S. Pat. No. 3,393,210.

Examples are polyamides derived from lactams having from 7 to 13 ring members, such as polycaprolactam, polycapryllactam and polylaurinlactam, and polyamides obtained by reaction of dicarboxylic acids with diamines.

Dicarboxylic acids which may be employed are alkanedicarboxylic acids having from 6 to 12, in particular from 6 to 10 carbon atoms, and aromatic dicarboxylic acids. Adipic acid, azelaic acid, sebacic acid, dodecanedioic acid and terephthalic and isophthalic acid may be mentioned merely as examples.

Particularly suitable diamines are alkanediamines having from 6 to 12, in particular from 6 to 8 carbon atoms, and m-xylylenediamine, di(4-aminophenyl)methane, di(4-aminocyclohexyl)methane, 2,2-di(4-aminophenyl)propane and 2,2-di(4-aminocyclohexyl)propane.

Preferred polyamides are polyhexamethyleneadipamide, polyhexamethylenesebacamide, polycaprolactam and the copolymer nylon-6/6,6, in particular with a proportion of from 5 to 95% by weight of caprolactam units.

Other examples are polyamides which are obtainable, for example, by condensation of 1,4-diaminobutane with adipic acid at elevated temperature (nylon-4,6). Preparation methods for polyamides of this structure are described, for example, in EP-A 38 094, EP-A 38 582 and EP-A 39 524.

Other suitable polyamides are those which are obtainable by copolymerization of two or more of the monomers mentioned above, and mixtures of a number of polyamides in any desired ratio.

Partially aromatic copolyamides, such as nylon-6/6T and nylon-6,6/6T, whose triamine content is less than 0.5% by weight, preferably less than 0.3% by weight, have also proven particularly advantageous (see EP-A 299 444).

The partially aromatic copolyamides with low triamine content can be prepared by the methods described in EP-A 129 195 and 129 196.

Suitable polyphenylene ethers generally have a molecular weight (weight average) in the range from 10,000 to 80,000, preferably from 20,000 to 60,000, and in particular from 40,000 to 55,000.

The molecular weight distribution is generally determined by gel permeation chromatography (GPC), for which PPE specimens are dissolved in THF at 110° C. under superatmospheric pressure. 0.16 ml of a 0.25% strength solution is injected at room temperature onto suitable separating columns, using THF as eluent. Detection is generally by UV detector, and the separating columns are expediently calibrated with PPE specimens of known molecular weight distribution.

This corresponds to a reduced specific viscosity ηred of from 0.2 to 0.9 dl/g, preferably from 0.35 to 0.8 dl/g, and in particular from 0.45 to 0.6 dl/g, measured in 0.5% strength by weight solution in chloroform at 25° C.

The unmodified polyphenylene ethers $a_1$) are known per se and are advantageously prepared by oxidative coupling of o-disubstituted phenols.

Examples of substituents are halogens, such as chlorine and bromine, and alkyl having from 1 to 4 carbon atoms and preferably no tertiary hydrogen in the α-position, for example methyl, ethyl, propyl and butyl. The alkyl radicals may themselves be halo-substituted, for example with chlorine or bromine, or hydroxy-substituted. Other examples of possible substituents are alkoxy, preferably having up to 4 carbon atoms, and phenyl, which may be unsubstituted or halo- and/or alkyl-substituted. Copolymers of different phenols, for example copolymers of 2,6-dimethylphenol and 2,3,6-trimethylphenol, are likewise suitable. Mixtures of different polyphenylene ethers may, of course, also be employed.

The polyphenylene ethers used as component $a_1$) may contain defects which arise during their preparation and which are described, for example, in White et al., Macromolecules 23, 1318–1329 (1990).

It is advantageous to employ polyphenylene ethers which are compatible with vinylaromatic polymers, ie. which are completely or largely soluble in these polymers (cf. A. Noshay, Block Copolymers, pp. 8 to 10, Academic Press, 1977 and O. Olabisi, Polymer-Polymer Miscibility, 1979, pp. 117 to 189).

Examples of polyphenylene ethers are poly(2,6-dilauryl-1,4-phenylene) ether, poly(2,6-diphenyl-1,4-phenylene) ether, poly(2,6-dimethoxy-1,4-phenylene) ether, poly(2,6-diethoxy-1,4-phenylene) ether, poly(2-methoxy-6-ethoxy-1,4-phenylene) ether, poly(2-ethyl-6-steuryloxy-1,4-phenylene) ether, poly(2,6-dichloro-1,4-phenylene) ether, poly(2-methyl-6-phenyl-1,4-phenylene) ether, poly(2,6-dibenzyl-1,4-phenylene) ether, poly(2-ethoxy-1,4-phenylene) ether, poly(2-chloro-1,4-phenylene) ether, poly(2,5-dibromo-1,4-phenylene) ether. Preference is given to polyphenylene ethers in which the substituents are alkyl with from 1 to 4 carbon atoms, such as poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether and poly(2-ethyl-6-propyl-1,4-phenylene) ether.

Graft copolymers of polyphenylene ethers and vinylaromatic monomers such as styrene, α-methylstyrene, vinyltoluene and chlorostyrene, are also suitable.

Functionalized or modified polyphenylene ethers are known per se, for example from WO-A 86/02086, WO-A 87/00540, EP-A-222 246, EP-A-223 116 and EP-A-254 048, and are preferably employed for mixtures with PA or polyester.

Generally, an unmodified polyphenylene ether $a_1$) is modified by incorporating at least one carbonyl, carboxylic acid, carboxylic anhydride, carboxylic amide, carboxylic imide, carboxylic ester, carboxylate, amino, hydroxyl, epoxy, oxazoline, urethane, urea, lactam or halobenzyl group, in order to ensure adequate compatibility with, for example, the polyamide.

The modification is generally carried out by reaction of an unmodified polyphenylene ether $a_1$) with a modifier containing at least one of the abovementioned groups and at least one carbon-carbon double or carbon-carbon triple bond, in solution (WO-A 86/2086), in aqueous dispersion, in a gas-phase process (EP-A-25 200) or in the melt, if appropriate in the presence of suitable vinylaromatic polymers or impact modifiers; free-radical initiators may be present if desired.

Suitable modifiers ($a_3$) are, for example, maleic acid, methylmaleic acid, itaconic acid, tetrahydrophthalic acid, anhydrides and imides of these, fumaric acid, the mono- and diesters formed from these acids with, for example, $C_1$- and $C_2$–$C_8$-alkanols ($a_{31}$), the mono- and diamides of these acids, such as N-phenylmaleimide (monomers $a_{32}$), and maleic hydrazide. Other examples are N-vinylpyrrolidone and (meth)acryloylcaprolactam ($a_{33}$).

Component A) in the novel molding compositions is preferably a modified polyphenylene ether which can be obtained by reaction of $a_1$) from 70 to 99.5% by weight, preferably from 76.5 to 99.94% by weight, of an unmodified polyphenylene ether, $a_2$) from 0 to 25% by weight, preferably from 0 to 20% by weight, of a vinylaromatic polymer, $a_3$) from 0.05 to 5% by weight, preferably from 0.05 to 2.5% by weight, of at least one compound selected from the group consisting of $a_{31}$) an α,β-unsaturated dicarbonyl compound, $a_{32}$) a monomer containing amido groups and having a polymerizable double bond and $a_{33}$) a monomer containing lactam groups and with a polymerizable double bond, $a_4$) from 0 to 5% by weight, preferably from 0.01 to 0.09% by weight, of a free-radical initiator, where the percentages by weight are based on the total of $a_1$) to $a_4$), over from 0.5 to 15 minutes and at from 240 to 375° C. in suitable mixing and compounding apparatuses, such as twin-screw extruders.

The vinylaromatic polymer $a_2$) should preferably be compatible with the polyphenylene ether employed, as described above.

Examples of preferred vinylaromatic polymers, which are compatible with polyphenylene ethers, are seen in the abovementioned monograph by Olabisi, pp. 224 to 230 and 245.

Examples of free-radical initiators $a_4$) are:

2,4-dichlorobenzoyl peroxide, tert-butyl peroxide, 3,5,5-trimethylhexanoyl peroxide, lauroyl peroxide, decanoyl peroxide, propionyl peroxide, benzoyl peroxide, tert-butyl 2-ethylperoxyhexoate, tert-butyl peroxydiethylacetate, tert-butyl peroxyisobutyrate, 1,1-di-tert-butylperoxy-3,3,5-trimethylcyclohexane, tert-butylperoxy isopropyl carbonate, tert-butylperoxy-3,3,5-trimethylhexoate, tert-butyl peracetate, tert-butyl perbenzoate, butyl 4,4-di-tert-butylperoxy valerate, 2,2-di-tert-butylperoxybutane, cumyl peroxide, tert-butylcumyl peroxide, 1,3-di(tert-butylperoxyisopropyl)benzene and tert-butyl peroxide. Mention may also be made of organic hydroperoxides, such as diisopropylbenzene hydroperoxide, cumene hydroperoxide, tert-butyl hydroperoxide, p-methyl hydroperoxide and pinane hydroperoxide and highly-branched alkanes of the structure

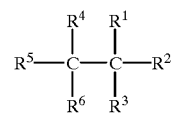

where $R^1$ to $R^6$ are alkyl with from 1 to 8 carbon atoms, alkoxy having from 1 to 8 carbon atoms, aryl, such as phenyl, naphthyl or 5- or 6-membered heterocyclic rings with a π-electron system and nitrogen, oxygen or sulfur as heteroatoms. The substituents $R^1$ to $R^6$ may themselves be substituted with functional groups, such as carboxyl, carboxyl derivatives, hydroxyl, amino, thiol or epoxide. Examples are 2,3-dimethyl-2,3-diphenylbutane, 3,4- dimethyl-3,4-diphenylhexane and 2,2,3,3-tetraphenylbutane.

Particularly preferred polyphenylene ethers A) in the novel molding compositions are those obtained by modification using maleic acid, maleic anhydride or fumaric acid. Polyphenylene ethers of this type preferably have an acid number of from 1.8 to 3.2, in particular from 2.0 to 3.0.

The acid number is a measure of the degree of modification of the polyphenylene ether and is generally determined by titration with bases under inert gas.

The acid number generally corresponds to the amount of base in mg which is required (according to DIN 53 402) for neutralization of 1 g of a polyphenylene ether which has been acid-modified as described.

Mixtures of polyesters, polyamides and polyphenylene ethers may also be employed. Polyamides or polyesters are preferably mixed with modified polyphenylene ethers.

The novel molding compositions include, as component B), 1 to 60% by weight, preferably from 1 to 50% by weight, and in particular from 5 to 20% by weight, of red phosphorus, which is pretreated with from 0.01 to 2% by weight, preferably from 0.1 to 1.5% by weight, and in particular from 0.4 to 1.0% by weight, of a phlegmatizer and from 2 to 15% by weight, preferably from 3 to 10% by weight, and in particular from 4 to 8% by weight, of a mineral filler.

The total of the percentages by weight of the mineral filler, the phlegmatizer and the red phosphorus is always 100% by weight.

The mean particle size ($d_{50}$) of the phosphorus particles distributed in the molding compositions is usually up to 2 mm, preferably from 0.0001 to 0.5 mm.

Component B) is preferably prepared by
a) adding the mineral filler to an alkaline aqueous suspension of phosphorus,
b) reacting the suspension with an aqueous emulsion of the phlegmatizer and
c) then removing the solvent and drying the residue.

The aqueous suspension preferably includes up to 75 parts by weight of red phosphorus, and the aqueous emulsion preferably includes up to 40% by weight of the compound which serves as phlegmatizer.

The pH range of the phosphorus suspension is generally from 6 to 9. The reaction is advantageously carried out at from 20 to 90 °C., in particular from 25 to 85° C.

The reaction time is advantageously from 0.5 to 3 hours, after which the phosphorus is separated and dried in an inert gas stream, for example of nitrogen, at from 80 to 120° C.

The phlegmatized phosphorus can, in general, easily be incorporated in powder form into the novel molding compositions.

Concentrates of phlegmatized phosphorus, for example in a polyamide or in an elastomer, with up to 60% by weight of phosphorus, are also suitable.

Suitable mineral fillers are calcium silicates and magnesium silicates, wollastonite and talc being preferred.

The mean particle size ($d_{50}$) is usually from 1 to 500 $\mu$m.

Suitable phlegmatizers are mineral oils, paraffin oils, chloroparaffins, trimellitates, preferably of alcohols having from 5 to 10 carbon atoms, such as trioctyl trimellitate, and aromatic phosphate compounds, for example tricresyl phosphate.

Phthalates which can be formed from phthalic acid and alcohols having from 6 to 13 carbon atoms are especially preferred for use as phlegmatizers. Dioctyl phthalates are especially preferred, and di-2-ethylhexyl phthalate is particularly preferred.

The novel molding compositions may contain, as component C), from 0 to 70% by weight, in particular up to 50% by weight, of other additives and processing aids.

Conventional additives are, for example, elastomeric polymers (also referred to as impact modifiers, elastomers or rubbers) in amounts of up to 40% by weight, preferably up to 30% by weight.

These are generally copolymers, preferably built up from at least two of the following monomers: ethylene, propylene, butadiene, isobutene, isoprene, chloroprene, vinyl acetate, styrene, acrylonitrile and (meth)acrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, 1961), pp. 392 to 406 and in the monograph by C. B. Bucknall, "Toughened Plastics" (Applied Science Publishers, London, 1977).

Some preferred types of such elastomers are listed below.

Preferred types of such elastomers are the ethylene-propylene rubbers (EPM) and the ethylene-propylene-diene rubbers (EPDM).

EPM rubbers generally have virtually no residual double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes with from 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene, 2-isopropenyl-5-norbornene, and tricyclodienes, such as 3-methyltricyclo(5.2.1.0.2.6)-3,8-decadiene or mixtures of these. Preference is given to hexa-1,5-diene, 5-ethylidenenorbornene and dicyclopentadiene. The diene content of the EPDM rubbers is preferably from 0.5 to 50% by weight, in particular from 1 to 8% by weight, based on the total weight of the rubber.

EPM or EPDM rubbers may preferably also be grafted with reactive carboxylic acids or their derivatives, for example acrylic acid, methacrylic acid or their derivatives, such as glycidyl (meth)acrylate, or maleic anhydride.

Copolymers of ethylene with acrylic acid and/or methacrylic acid and/or the esters of these acids are a further group of preferred rubbers. The rubbers may also include dicarboxylic acids, such as maleic acid and fumaric acid, or derivatives of these acids, eg. esters or anhydrides, and/or epoxy-containing monomers. These dicarboxylic acid derivatives or epoxy-containing monomers are preferably incorporated into the rubber by addition to the monomer mixture of monomers containing dicarboxylic acid and/or epoxy groups of the formula I, II, III or IV:

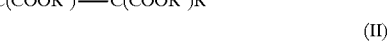

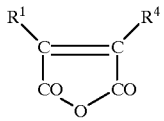

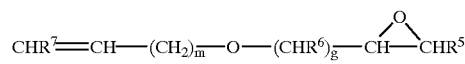

-continued $$CH_2 = CR^9 - COO - (CH_2)_p - CH - CHR^8 \underset{O}{\diagdown\diagup} \qquad (IV)$$

where $R^1$ to $R^9$ are hydrogen or alkyl having from 1 to 6 carbon atoms, and m is an integer from 0 to 20, g is an integer from 0 to 10, and p is an integer from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy-containing (meth)acrylates, such as glycidyl (meth)acrylate, and the esters with tertiary alcohols, such as tert-butyl acrylate. Although these latter have no free carboxyl groups, their behavior approximates to that of the free acids, and they are therefore referred to as monomers with latent carboxyl groups.

The copolymers advantageously consist of from 50 to 98% by weight of ethylene, from 0.1 to 20% by weight of epoxy-containing monomers and/or monomers containing methacrylic acid and/or anhydride groups, the residual amount being (meth)acrylates.

Particular preference is given to copolymers of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Other preferred acrylates and/or methacrylates are methyl, ethyl, propyl, isobutyl and tert-butyl (meth)acrylates.

Besides these, vinyl esters and vinyl ethers may be employed as comonomers.

The ethylene copolymers described above may be prepared by processes known per se, preferably by random copolymerization under elevated pressure and temperature. Processes of this type are well known.

Other preferred elastomers are emulsion polymers whose preparation is described, for example, by Blackley in the monograph "Emulsion Polymerization". The emulsifiers and catalysts which may be used are known per se.

In principle, both elastomers with a homogeneous construction and those with a shell construction may be employed. The shell construction depends on the addition sequence of the individual monomers; the morphology of the polymers is also influenced by this addition sequence.

Compounds which may be mentioned merely as examples of monomers for preparing the elastic part of the elastomers are acrylates, for example n-butyl acrylate and 2-ethylhexyl acrylate, the corresponding methacrylates, butadiene and isoprene and mixtures of these. These monomers may be copolymerized with other monomers, such as styrene, acrylonitrile, vinyl ethers and other acrylates or methacrylates, such as methyl methacrylate, methyl acrylate, ethyl acrylate and propyl acrylate.

The soft or elastic phase (with a glass transition temperature of less than 0° C.) of the elastomers can be the core, the outer shell or an intermediate shell (in elastomers of multi-shell construction); multishell elastomers may have a number of shells formed from an elastic phase.

If one or more hard components (with glass transition temperatures of greater than 20° C) are involved, besides the elastic phase, in the construction of the elastomer, these are generally prepared by polymerization of styrene, acrylonitrile, methacrylonitrile, α-methylstyrene, p-methylstyrene, or acrylates or methacrylates, such as methyl acrylate, ethyl acrylate and methyl methacrylate, as main monomers. Besides these, smaller amounts of other comonomers may also be employed.

In a number of cases, it has proven advantageous to employ emulsion polymers having reactive groups at the surface. Groups of this type are, for example, epoxy, carboxyl, latent carboxyl, amino and amido, and functional groups which can be introduced by incorporation of monomers of the formula $$CH_2 = \underset{\underset{R^{10}}{|}}{C} - X - \underset{\underset{R^{11}}{|}}{N} - \underset{\underset{O}{\|}}{C} - R^{12}$$

where
$R^{10}$ is hydrogen or $C_1$–$C_4$-alkyl,
$R^1l$ is hydrogen, $C_1$–$C_8$-alkyl or aryl, in particular phenyl;
$R^{12}$ is hydrogen, $C_1$–$C_{10}$-alkyl, $C_6$-$C_{12}$-aryl or —$OR^{13}$
$R^{13}$ is $C_1$-$C_8$-alkyl or $C_6$-$C_{12}$-aryl, each of which may be substituted with oxygen- or nitrogen-containing groups,
X is a chemical bond, $C_1$–$C_{10}$-alkylene or $C_6$–$C_{12}$-arylene or $$-\underset{\underset{O}{\|}}{C} - Y$$

Y is O—Z or NH—Z and
Z is $C_1$–$C_{10}$-alkylene or $C_6$–$C_{12}$-arylene.

The graft monomers described in EP-A 208 187 are also suitable for introducing reactive groups at the surface.

Further examples are acrylamide, methacrylamide, and substituted acrylates and methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The constituents of the elastic phase may also be crosslinked. Monomers which act as crosslinkers are, for example, buta-1,3-diene, divinylbenzene, diallyl phthalate, dihydrodicyclopentadienyl acrylate and the compounds described in EP-A 50 265.

Use may, furthermore, be made of graft-linking monomers, ie. monomers having two or more polymerizable double bonds which react at different rates during polymerization. Preference is given to compounds of this type in which at least one reactive group polymerizes at about the same rate as the remaining monomers, whereas the other reactive group(s), for example, polymerize(s) significantly more slowly. The different polymerization rates give rise to a certain proportion of unsaturated double bonds in the elastomer. If a further phase is then grafted onto an elastomer of this type, at least some of the double bonds in the elastomer react with the graft monomers to form chemical bonds, ie. the grafted phase is, at least to some extent, linked to the graft base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate, and the corresponding monoallyl compounds of these dicarboxylic acids. In addition, there are many other suitable graft-linking monomers; further details may be seen, for example, in U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below, beginning with graft polymers which have a core and at least one outer shell, and which have the following construction:

| Type | Monomers for the core | Monomers for the shell |
|---|---|---|
| I | Buta-1,3-diene, isoprene, n-butyl acrylate, ethylhexyl acrylate or mixtures of these | Styrene, acrylonitrile, methyl methacrylate |
| II | As I but with addition of cross linkers | As I |
| III | As I or II | n-Butyl acrylate, ethyl acrylate, methyl acrylate, buta-1,3-diene, isoprene, ethylhexyl acrylate |
| IV | As I or II | As I or III but with addition of monomers with reactive groups as described herein |
| V | Styrene, acrylonitrile, methyl methacrylate or mixtures of these | First shell of monomers as described under I and II for the core Second shell as described under I or IV for the shell |

These graft polymers are particularly employed for impact modification of mixtures of PET and PBT. Blends of this type are commercially obtainable under the name Ultradur® S (previously Ultrablend® (BASF AG)), and in a mixture with polycarbonates under the name Terblend® of BASF AG.

Instead of graft polymers with a multishell construction, homogeneous, ie. single-shell, elastomers of buta-1,3-diene, isoprene and n-butyl acrylate or copolymers of these may also be employed. These products may also be prepared with addition of crosslinking monomers or monomers with reactive groups.

Examples of preferred emulsion polymers are n-butyl acrylate-(meth)acrylate copolymers, n-butyl acrylate-glycidyl acrylate and n-butyl acrylate-glycidyl methacrylate copolymers, graft polymers with an inner core of n-butyl acrylate or based on butadiene and an outer shell of the abovementioned copolymers and copolymers of ethylene with comonomers which provide reactive groups.

The elastomers described may also be prepared by other conventional processes, for example by suspension polymerization.

Preference is likewise given to silicone rubbers, as described in DE-A 37 25 576, EP-A 235 690, DE-A 38 00 603 and EP-A 319 290.

Mixtures of the rubber types mentioned above may, of course, also be employed.

Examples of fibrous fillers are carbon fibers, glass fibers, glass beads, amorphous silica, asbestos, potassium titanate whiskers and aramid fibers, in amounts of up to 50% by weight, in particular up to 40% by weight.

The novel thermoplastic molding compositions may also include stabilizers, oxidation inhibitors, thermal and UV stabilizers, lubricants, demolding aids, colorants, such as dyes and pigments, nucleating agents, plasticizers, etc.

Examples of oxidation inhibitors and thermal stabilizers are sterically hindered phenols, hydroquinones, aromatic secondary amines such as diphenylamines, and various substituted members of these groups, and mixtures of these in concentrations of up to 1% by weight, based on the weight of the thermoplastic molding composition.

Examples of UV stabilizers, generally in amounts of up to 2% by weight, based on the molding composition, are various substituted resorcinols, salicylates, benzotriazoles and benzophenones.

Inorganic pigments, such as titanium dioxide, Ultramarine blue, iron oxide and carbon black, and organic pigments, such as phthalocyanines, quinacridones, and perylenes, and dyes, such as nigrosin and anthraquinones, may be added as colorants.

Sodium phenylphosphinate, alumina or silica may be added as nucleating agent.

Lubricants and demolding aids, which are usually employed in amounts of up to 1% by weight, are preferably long-chain fatty acids (eg. stearic acid and docosanoic acid), salts of these (eg. calcium and zinc stearates) or amide derivatives (eg. ethylenebisstearylamide) or montan waxes (mixtures of straight-chain, saturated carboxylic acids with chain lengths of from 28 to 32 carbon atoms) or low-molecular-weight polyethylene waxes or polypropylene waxes.

The novel molding compositions may also include from 0 to 2% by weight of fluorine-containing ethylenic polymers. These are ethylenic polymers with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with smaller proportions (generally up to 50% by weight) of copolymerizable ethylenically unsaturated monomers. These are described, for example, by Schildknecht in "Vinyl and Related Polymers", Wiley, 1952, p. 484 to 494 and by Wall in "Fluoropolymers" (Wiley Interscience, 1972).

These fluorine-containing ethylenic polymers are homogeneously distributed in the molding compositions and preferably have a particle size $d_{50}$ (number average) in the range from 0.05 to 10 μm, in particular from 0.1 to 5 μm. These low particle sizes may particularly preferably be achieved by the use of aqueous dispersions of fluorine-containing ethylenic polymers and by incorporating these into a polyester melt.

To improve compatibility with the thermoplastic polymers, minerals and fillers are, if desired, treated with a bonding agent. Glycidyl-, vinyl- and aminoalkyltrialkoxysilanes are preferred.

The novel thermoplastic molding compositions can be prepared by processes known per se, by mixing the starting components in conventional mixing apparatus such as screw-extruders, Brabender mixers or Banbury mixers, and extruding them. After extrusion, the extrudate can be cooled and comminuted. It is also possible to premix individual components and then to add the remaining starting materials, either individually or mixed. The mixing is generally carried out at from 230 to 290° C.

In a preferred method of operation, component B) and, if desired, conventional additives C) are mixed with a polyamide prepolymer or a polyester prepolymer, compounded and granulated. The resultant granules are then subjected to continuous or batch condensation under inert gas at a temperature below the melting point of component A), until the desired viscosity is reached.

The novel thermoplastic molding compositions have good flame retardancy together with good mechanical properties. Shaped articles with low wall thickness, in particular, have a UL 94 classification V-0 or V-1, and an improved phosphorus stability. The molding compositions are suitable for producing fibers, films and shaped articles, in particular for applications in the electrical and electronic sectors. Particular applications are lamp parts, such as lamp sockets and lamp holders, plugs and multipoint connectors, coil formers, casings for capacitors or connectors, and circuit-breakers, relay housings and reflectors.

EXAMPLES

1. Preparation of component B)

500 ml of an alkaline aqueous suspension of phosphorus containing 237.5 g of red phosphorus and 12.5 g of wollastonite or 12.5 g of talc (or containing 250 g of red phosphorus in the case of Example 3*) were heated to 60° C. and adjusted to a pH of 8 by addition of 5% strength sulfuric acid.

0.75 g of an emulsifier (Arkopal® N 090, Hoechst) was stirred into 100 g of di-2-ethylhexyl phthalate (DOP), and 300 ml of water were added with stirring.

7 ml of the DOP emulsion were added to the abovementioned phosphorus suspension. The suspension was then stirred at 60° C. for one hour, and then filtered. The filter residue was washed with water and then dried at 100° C. in a nitrogen stream.

2. The following components were employed:

Component A)

Nylon 6,6 with a viscosity number (VN) of 152 ml/g (measured as 0.5% strength solution in 96% strength by weight sulfuric acid at 25° C.)

Component B)

Component B1: Mixture of 94.3% by weight of red phosphorus, 0.7% by weight of DOP, 5% by weight of wollastonite Component B2: Mixture of 94.3% by weight of red phosphorus, 0.7% by weight of DOP, 5% by weight of talc Component B3: Mixture of 99.3% by weight of red phorphorus, 0.7% by weight of DOP (for comparison)

The mean particle size ($d_{50}$) of the phosphorus was 45 μm.

Component C

C1:

An olefinic copolymer of:

59.8% by weight of ethylene

35% by weight of n-butyl acrylate 4.5% by weight of acrylic acid 0.7% by weight of maleic anhydride with an MFI of 10 g/10 min at 190° C. with 2.16 kg load.

C2: Glass fibers with a mean diameter of 10 μm

C3: zinc oxide

3. Preparation of the molding compositions:

The components A) to C) were compounded in a twin-screw extruder (120 rpm; 30 kg/h) at 280° C., extruded, and cooled and granulated in a water bath.

For the Comparative Example 4*, wollastonite in an equal mixing proportion, based on A) to C) was additionally incorporated in the usual way during compounding as component C4, and a phlegmatized mixture of red phosphorus with 0.7% by weight of DOP was employed as component B3.

The granules were dried at 80° C. under reduced pressure and converted into standard test specimens at 280° C. in an injection-molding machine.

The fire test was carried out according to UL 94 on 1/16 and 1/32 inch test specimens, with the usual conditioning. The modulus of elasticity was measured according to DIN 53457.

The phosphorus degradation (proportion of soluble phosphorus derivatives) was measured after storage of the shaped articles in a water bath at 60° C.: water samples were taken after 100 days and their phosphorus content was measured.

The formulation of the molding compositions, and the results, are shown in the table.

| Formulation Ex. (% by weight) | Modulus of elasticity (MPa) | UL 94 test 1/16" | UL 94 test 1/32" | Phosphorus degradation (ppm) after 100 days |
|---|---|---|---|---|
| 1  63.3A, 5B/1, 6C1, 25C2, 0.7C3 | 8300 | V-0 | V-0 | 45 |
| 2  63.3A, 5B/2, 6C1, 25C2, 0.7C3 | 8500 | V-0 | V-1 | 50 |
| 3* 63.3A, 5B/3, 6C1, 25C2, 0.7C3 | 8000 | V-1 | V- | 90 |
| 4* 62.75A, 5B/3, 6C1, 25C2, 0.7C3, 0.25C4 | 7990 | V-1 | V- | 90 |

*for comparison

We claim:

1. A thermoplastic molding composition comprising

A) from 5 to 99% by weight of a thermoplastic polymer selected from the group consisting of polyamides, polyesters, polyphenylene ethers and mixtures of these, B) from 1 to 60% by weight of red phosphorus which has been pretreated with from 0.01 to 2% by weight, based on 100% by weight of B), of a phlegmatizer and from 2 to 15% by weight of a mineral filler, C) from 0 to 70% by weight of other additives and processing aids, where the sum of the percentages by weight of components A) to C) is 100%.

2. A thermoplastic molding composition as defined in claim 1, comprising red phosphorus which has been-pretreated with from 0.1 to 1.5% by weight, based on 100% by weight of B), of a phlegmatizer and from 3 to 10% by weight of a mineral filler.

3. A thermoplastic molding composition as defined in claim 1, in which the polyamide A) is nylon-6,6, nylon-6, nylon-6/6T or nylon-6,6/6T.

4. A thermoplastic molding composition as defined in claim 1, in which the phlegmatizer is built up from mineral oils, paraffin oils, chloroparaffins, trimellitates, aromatic phosphates, phthalates, or mixtures of these.

5. A thermoplastic molding composition as defined in claim 1, in which the mineral filler consists of wollastonite or talc or mixtures of these.

6. A thermoplastic molding composition as defined in claim 1, in which B) is obtained by a) adding the mineral filler to an alkaline aqueous suspension of phosphorus, b) reacting the suspension with an aqueous emulsion of the phlegmatizer and c) then removing the solvent and drying the residue.

7. A shaped article obtained from the thermoplastic molding composition defined in claim 1.

* * * * *